C. H. STRAIGHT.
Vault-Cover and Railing.
No. 195,965. Patented Oct. 9, 1877.
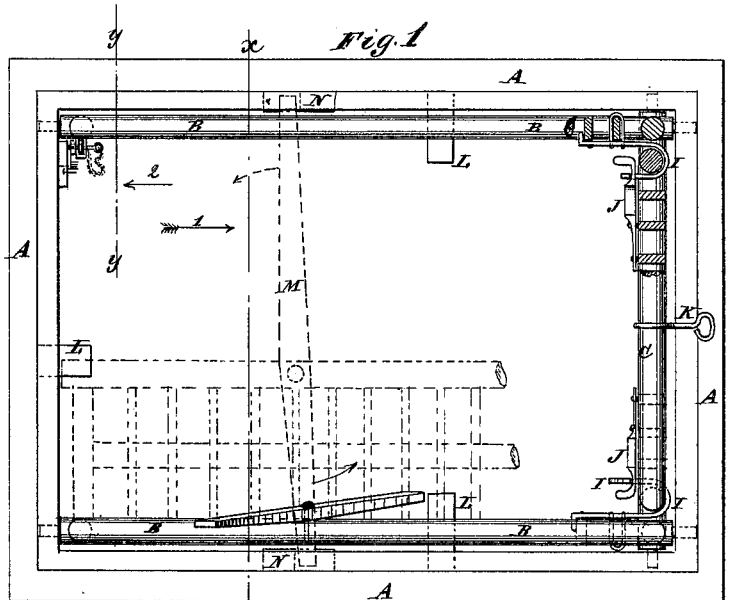
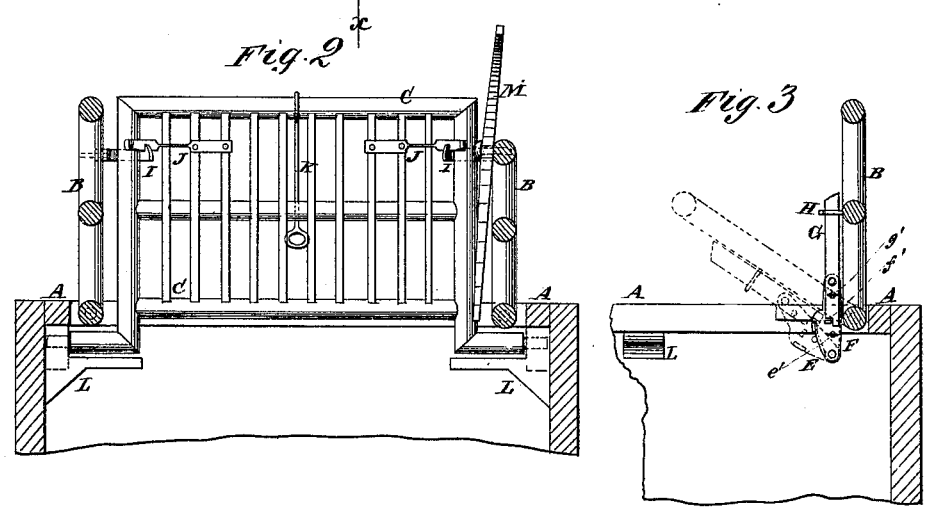
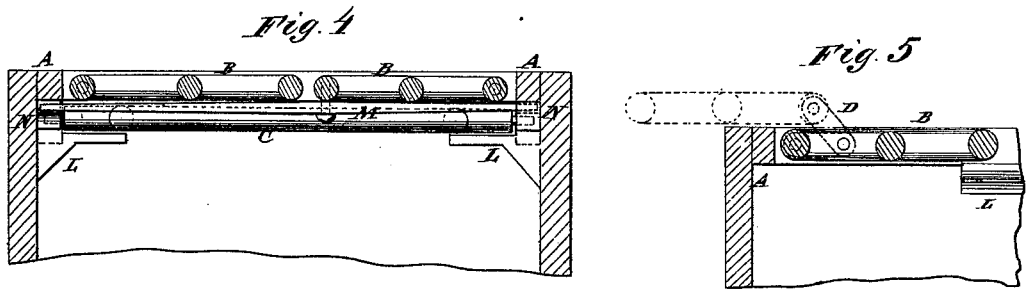
WITNESSES:
A. W. Almqvist
J. H. Scarborough
INVENTOR:
C. H. Straight
BY Munn & Co.
ATTORNEYS.

UNITED STATES PATENT OFFICE.

CLARENCE H. STRAIGHT, OF BRYAN, OHIO.

IMPROVEMENT IN VAULT-COVER AND RAILING.

Specification forming part of Letters Patent No. 195,965, dated October 9, 1877; application filed June 30, 1877.

*To all whom it may concern:*

Be it known that I, CLARENCE H. STRAIGHT, of Bryan, county of Williams, and State of Ohio, have invented a new and useful Improvement in Combined Grating and Railing, of which the following is a specification:

Figure 1 is a top view of my improved device arranged for use as a railing, partly in section, to show the construction. Fig. 2 is a vertical cross-section of the same, taken through the line $x\ x$, Fig. 1. Fig. 3 is a detail section taken through the line $y\ y$, Fig. 1. Fig. 4 is the same section as Fig. 2, but showing the device arranged as a grating. Fig. 5 is a detail section, showing a modification of the hinge.

Similar letters of reference indicate corresponding parts.

The object of this invention is to furnish an improved grating which shall be so constructed that it may also serve as a railing, and which shall be simple in construction, and convenient and reliable in use in either capacity.

The invention consists in the combination of the rigid arm, the pivoted bars, the stop, and the locking-pins with each other, and with the racks and the frame; in the combination of the catch-hooks and the spring-latches with the hinged racks; and in the combination of the short pivoted bars with the racks and the frame, for hinging said racks to said frame, as hereinafter fully described.

In the drawings, A represents the frame of the area, stairway, or hatchway, to which the grating is applied. B are the side racks, which are hinged to the frame A by having pivots formed upon the ends of their outer side bars, to work in bearings attached to the frame A. C is the end rack, the end bars of which are extended downward to pass below the side racks B, are bent outward at right angles, and have pivots formed upon their ends to work in bearings attached to the frame A; or the racks B C may be hinged to the frame A by the short bars D, the ends of which are pivoted to the corners of the said racks B C, and their outer ends are pivoted to the frame A, as shown in Fig. 5. This mode of hinging allows the racks B C to be turned down outward, so as to rest upon the pavement or floor, as shown in dotted lines in Fig. 5. To an end bar of the frame A, near its corners, is attached a downwardly-projecting arm, E, to the lower end of which is pivoted the lower end of the bar F.

The upper end of the bar F is pivoted to the bar G at a little distance from its upper end, so that when the bars F G come into line with each other the lower end of the said bar G may strike against a stop, $f'$, attached to the middle part of the said bar F.

The upper end of the bar G slides in a staple, H, attached to the end bar of the rack B, so that the rack B can be lowered to serve as a grating, or raised to serve as a railing. The rack B may be locked in place, when raised, by passing a pin, $g'$, through holes in the bars G F, and a pin, $e'$, through holes in the bar F and arm E. I are hooks attached to the end parts of the side racks B, to receive the end bars of the end racks C. The end parts of the hooks I project, and have notches formed in their upper edges to receive the spring-latches J, attached to the end rack C.

To the top bar of the end rack C is pivoted a rod, K, for convenience in raising and lowering it. The other end of the frame A may also be provided with an end rack, C, if desired.

The racks B C, when turned down to serve as a grating, rest upon brackets L, attached to the frame A, and the middle parts of the long or side racks B are supported by a cross-bar, M, pivoted to the top bar of one of said racks, and the ends of which swing into open or half keepers N, attached to the frame A.

If desired, the top bars of the racks B may be detachable, and connected with said racks by rings or links, so that they may be detached and allowed to hang free when the racks are lowered for a grating, and which may be replaced when the racks are raised as a railing.

Having thus fully described my invention, I claim as new and desire to secure by Letters Patent—

1. The combination of the rigid arm E, the pivoted bars F G, the stop $f'$, and the locking-pins $g'$ $e'$ with each other, and with the racks B and the frame A, substantially as herein shown and described.

2. The combination of the catch-hooks I and the spring-latches I with the hinged racks B C, substantially as herein shown and described.

3. The combination of the short pivoted bars D with the racks B C and the frame A, for hinging said racks to said frame, substantially as herein shown and described.

CLARENCE H. STRAIGHT.

Witnesses:
 M. J. MOONEY,
 F. J. KLEIN.